3,740,370
COATING COMPOSITION COMPRISING A CO-
POLYMER OF VINYL CHLORIDE AND AN
UNSATURATED GLYCIDYL COMPOUND
Akihide Nakamura and Iko Ito, Niihama, and Taizo Kondo and Keizo Inamura, Hiratsuka, Japan, assignors to Sumitomo Chemical Co., Ltd., Osaka, and Kansai Paint Company, Limited, Amagasaki, Japan
No Drawing. Continuation-in-part of application Ser. No. 725,928, Apr. 30, 1968. This application Oct. 27, 1971, Ser. No. 193,198
Claims priority, application Japan, Sept. 13, 1966, 41/60,572
Int. Cl. C08f 45/36, 45/38
U.S. Cl. 260—31.8 U                               6 Claims

ABSTRACT OF THE DISCLOSURE

When a copolymer of an average polymerization degree of 400–700, obtained by emulsion-polymerizing 95.0–99.5% by weight of vinyl chloride (or a monomer mixture of more than 80% vinyl chloride and another ethylenic monomer copolymerizable with vinyl chloride) and 0.5–5.0 weight percent of an unsaturated glycidyl compound, is heated together with a plasticizer and stabilizer so that the latter are absorbed in the resin particles, there is obtained a powdery resinous composition which shows excellent adhesion and film forming properties even when directly applied to a substrate, particularly metal surface without preapplication of a primer.

---

This is a continuation-in-part of Ser. No. 725,928, filed Apr. 30, 1968 now abandoned.

This invention relates to a powdery coating resin composition comprising a copolymer of vinyl chloride and an unsaturated glycidyl compound.

It is known to produce a vinyl chloride resin composition for molten coating by a dry blending method wherein plasticizers, stabilizers and pigments are added to a vinyl chloride resin powder and the mixture is heated and agitated by means of such agitator as a ribbon blender or Henschel mixer so that such liquid ingredient as the plasticizer may be absorbed on the resin particle and dried. Such powdery composition is used for coating articles according to the well known fluidized bed coating process or electrostatic powder coating process. However, such known composition is not satisfactory in film forming properties and its adhesion to the substrate is insufficient. Such insufficient adhesion to a substrate, particularly metal surface is a great disadvantage in employing the known vinyl chloride resin composition for molten coating.

On the other hand, there is known a method to improve the adhesion by applying a thin layer of a solvent type primer on a metal surface prior to coating with such vinyl chloride resin composition.

However, it is evident that such preapplication of a primer is costly in view of the material and requires additional time and labor, and is not desirable in view of the danger caused by the solvent.

Further, it is also well known that the temperature required for melting a vinyl chloride resin is so close to the pyrolizing temperature of the resin that the heating temperature for forming a molten film of the powdery composition must be controlled within a narrow range.

Therefore, it has been conventional to carry out the melt-coating by using a special furnace excellent in the performance and with a strict control of the operation. Accordingly, the operation cost is high, and yet it is difficult to obtain excellent and uniform coatings throughout the operation. Therefore, a powdery coating composition which is wide in the heating and melting temperature range is desired.

In order to expand the temperature range for forming films, it may be the most effective means at present to reduce the melting temperature of the powdery resin composition. For this purpose, it is preferable to reduce the molecular weight of the resin, for example, to be below 700 in the average polymerization degree. However, the resin of such low molecular weight is high in the softenability by the action of a plasticizer so that, unless the heating temperature in the dry blending step for absorbing the plasticizer is kept, for example, at a temperature of 80° C. or below, the particles will be fused together during the dry blending step and will not be obtained in the form of a powder. The conventional powdery composition produced under such low temperature heating condition is insufficient in the absorption of the plasticizer into the powdery resin so that it will not be well dried, will be therefore likely to cake while it is stored. Thus, an attempt to improve the film forming properties by using a resin of a low molecular weight has not been successful.

We have made extensive researches to obtain melt-coating resin compositions excellent in the adhesion of the coating film to the base even without being a primer and in the film forming properties, and have found that, when a copolymer of an average polymerization degree of 400–700 obtained by emulsion-polymerizing 95.0–99.5% by weight of vinyl chloride (or a monomer mixture of more than 80% vinyl chloride and another ethylenic monomer copolymerizable with vinyl chloride) and 0.5–5.0 weight percent of an unsaturated glycidyl compound is heated together with a plasticizer the stabilizer so that the latter are absorbed in the resin particles, there is obtained a powdery resinous composition which shows excellent adhesion and film forming properties even when directly applied to a substrate, particularly metal surface without preapplication of a primer.

An object of the present invention is to provide a powdery resin composition which can form a coating film excellent in the adhesion to the base without requiring a primer.

A further object of the present invention is to provide a powdery resin composition which can form a coating film excellent in the durability, chemical resistance and physical properties.

Another object of the present invention is to provide a powdery resin composition which can be processed over a wide range of temperature in the course of the production thereof and which shows minimum tendency to cake on storage.

A further object of the present invention is to provide a powdery resin composition which will melt at a temperature within a wide range easy enough to practice, and form a uniform, smooth and glossy coating.

The above mentioned objects of the present invention can be attained by producing a powdery resin composition by emulsion-copolymerizing (a) 95.0-99.5% by weight of a monomer selected from the group consisting of vinyl chloride and a monomer mixture consisting of at least 80% by weight of vinyl chloride and another ethylenic monomer copolymerizable with vinyl chloride and (b) 0.5-5.0% by weight of an unsaturated glycidyl compound having in the molecule one unsaturated bond copolymerizable with vinyl chloride and having one or more glycidyl groups and mixing the resulting copolymer with 20-35 parts by weight of a plasticizer for vinyl chloride resin, and, if desired, a proper amount of heat and light stabilizer for vinyl chloride resin and a proper amount of curing agent or pigments, fillers or surface active agents well known in the art, said copolymer having an average polymerization degree of 400-700.

The vinyl chloride copolymer according to the present invention is used mainly for a coating composition but, needless to say, can be used also for the same general purposes as of conventional vinyl chloride polymers.

The first advantage of the present coating composition is that, since a proper functional group is given to the resin by introducing the glycidyl group, the adhesion of the resin to the metal surface is excellent.

The second advantage is in that the cross-linking of the glycidyl group occuring at the time of heating and melting the composition will increase the molecular weight of the resin in the molten film and will contribute to the improvement of the performance of the film.

The third advantage is that the present composition has excellent film forming properties.

The average polymerization degree of the vinyl chloride copolymer of the present invention is relatively low so that the film forming properties is excellent. Further, due to the effect of the copolymerization, even if the dry blending temperature is kept at or above 100° C., the powder will not fuse to lump. As a result, there is obtained a well dried powdery composition not having a tendency to form cake.

Examples of the unsaturated glycidyl compound include glycidyl acrylate, glycidyl methacrylate, glycidyl crotonate, glycidyl alkyl maleates having alkyl radical of from 1 to 9 carbon atoms such as glycidyl methyl maleate, glycidyl butyl maleate and glycidyl octyl maleate, allyl glycidyl ether and styryl glycidy ether. If the amount of the unsaturated glycidyl compound in the copolymerization is less than 0.5% by weight, the powdery composition containing such copolymer as a main resin component would have poor adhesion to the metal surface, the dry-blendability will not be improved and therefore the powdery composition would likely to cake. On the other hand, if it is more than 0.5% by weight, the polymerizing velocity would be unduly, and the powdery composition containing such copolymer would be poor in film forming properties, and the molten film loses the inherent softness of a vinyl chloride resin.

Examples of the ethylenic monomer copolymerizable with vinyl chloride as the third component, include vinyl acetate, styrene, vinylidene chloride and ester having the following general formula:

$$CH_2=C-COOR^2$$
$$|$$
$$R'$$

in which R' is hydrogen or methyl group and R² is alkyl group of from 1 to 9 carbon atoms. The esters are, for example, ethyl acrylate, butyl acrylate, actyl acrylate, methyl methacrylate, butyl methacrylate or actyl methacrylate. It is preferable that the amount of such third monomer is less than 20% by weight based on the total monomers. If the amount of such monomer is more than 20% by weight, the formation of undesirably coarse particles will increase in the after-treatment of the copolymer. This tendency is not desirable for the powdery coating composition.

The vinyl chloride copolymers of the present invention is obtained by copolymerizing these monomers by the same ordinary emulsion-polymerization process as in the case of polymerization of vinyl chloride alone. For example, for the catalyst may be used such water-soluble radical initiator alone as hydrogen peroxide or potassium persulfate or a redox system consisting of a combination of such initiator and an organic or inorganic reducing agent such as l-ascorbic acid, sodium formaldehyde sulfoxylate, ferrous sulfate or cuprous sulfate. For the emulsifying agent can be used any emulsifying agent used in the ordinary emulsion-polymerization of vinyl chloride. Specifically it is preferable to use such anionic surface active agent as a sulfate or sulfonate system of an alkyl, aryl or aralkyl series hydrocarbon. The polymerization may be conducted at a temperature of 30°-70° C.

A conventional chain transfer agent such as trichloroethylene may be used to control the average polymerization degree of the copolymer within the range of 400 to 700 as required. After the completion of the polymerization, the vinyl chloride copolymer is after-treated by a conventional manner to obtain a powder of an average polymerization degree of 400-700.

The average polymerization degree referred to in the present invention is calculated as follows: Thus, 0.4 g. of a polymer is dissolved in 100 ml. of nitrobenzene, an insoluble portion, if any, is filtered off and the specific viscosity of the soluble portion is measured and is introduced into the following equation:

Average polymerization degree $\bar{p}$ $$=500\left(\text{antilog } e \frac{[\eta]}{0.168}-1\right)$$

wherein ($\eta$) represents an intrinsic viscosity and is calculated by the equation:

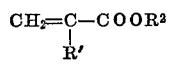

in which $\eta_{sp}$=Specific viscosity,
$\eta_{rel}=(\eta_{sp}+1)$: relative viscosity, and
C=Concentration (g./l.) of the soluble portion of the polymer.

The vinyl chloride copolymer obtained by the emulsion polymerization may be pulverized further as required.

The vinyl chloride copolymer to be used for the coating composition of the present invention must be of an average polymerization degree of 400-700. Further, at an average polymerization degree of 500-600, the most satisfactory result will be obtained. That is to say, the powdery composition using a resin of an average polymerization degree of 400-700 according to the present invention has excellent film forming properties and has a melting temperature range sufficient for the practice of application and the molten film gives a smooth glossy surface.

If the average polymerization degree is above 700, the film forming properties of the coating composition will be reduced and the desirable feature of the present composition will be lost. On the other hand, if the average polymerization degree is below 400, the composition tends to cake and the film properties are remarkably reduced.

The powder coating composition of the invention having such vinyl chloride copolymer as a main resin component can be prepared by conventional dry blending process wherein 20-35 parts by weight of a plasticizer and a proper amount of a stabilizer and a curing agent as required are absorbed while heating and agitating in 100 parts by weight of the vinyl chloride copolymer.

The vinyl chloride copolymer may be used alone or can be used with less than the same amount of such other polymer as a vinyl chloride homopolymer.

The average molecular weight of polyvinyl chloride resins is generally 60,000-150,000. However, in this application, the polymerization degree is controlled and therefore the molecular weight is smaller than about 50,000.

The plasticizer is used to reduce the melting temperature of the composition and to improve the properties of the molten film. Any known plasticizers for vinyl chloride polymer or a mixture of two or more of such plasticizers may be used.

As suitable plasticizers there may be employed di-alkyl adipates having alkyl radicals of from 6 to 10 carbon atoms (e.g., di-n-octyl adipate, di-2-ethyl hexyl adipate and di-isodecyl adipate), di-alkyl azelates having alkyl radicals of from 6 to 8 carbon atoms (e.g., di-n-octyl azelate and di-2-ethyl hexyl azelate), di-alkyl phthalates having alkyl radicals of from 4 to 13 carbon atoms (e.g., di-n-butyl phthalate, di-isobutyl phthalate, di-n-hexyl phthalate, di-n-octyl phthalate, di-2-ethyl hexyl phthalate and di-isodecyl phthalate), di-alkyl sebacates having alkyl radicals of 8 carbon atoms (e.g., di-n-octyl sebacate and di-2-ethyl hexyl sebacate) and epoxidized vegetable oils (e.g., epoxidized soyabean oil). The plasticizers may be used alone or in admixture.

In the present invention, the amount of the plasticizer to be contained in the composition must be 20-35 parts by weight per 100 parts by weight of the vinyl chloride copolymer. If the amount of the plasticizer is less than 20 parts by weight, the film forming properties of the composition will be reduced and the molten film will not give a smooth glossy surface. On the other hand, if the amount of the plasticizer is more than 35 parts, the composition will be likely to cake and its adhesion to the base will be reduced to an undesirable extent.

The stabilizer is used to improve the thermal and light stability of the vinyl chloride, polymer and any known stabilier may be employed. However, from the viewpoint of the adhesion to the metal surface, preferably an organic tin stabilizer or epoxy stabilizer is used. For eaxmple, such organic tin compound as dibutyl stannous dilaurate or dibutyl stannous mercaptide is used in an amount of 1-5 p.h.r. (that is, 1-5 parts by weight based on 100 parts by weight of vinyl chloride copolymer).

A curing agent may be added to the present coating composition. When a curing agent well known as a glycidyl group cross linking agent is added to the present coating composition a strong adhesion to the metal surface is promoted in many cases by heating in a shorter time or at a lower temperature. For example, such organic acid anhydride as phthalic anhydride maleic anhydride, or 1,4,5,6,7,7 - hexachloro - bicyclo(2,2,1) - 5-heptene-2,3-dicarboxylic anhydride, such amine as diethylenetriamine, methaphenylenediamine, triethanolamine or diaminodiphenylsulfone or such boron trifluoride complex salt as boron trifluoride monoethylamine or boron trifluoride piperidine may effectively be used as a curing agent. For example, addition of diaminodiphenyl sulfone in an amount of 0.5-1 p.h.r. enhances adhesion of a coating to the base.

Further, if desired, any known pigment such as titanium dioxide, carbon black, phthalocyanine green, phthalocyanine blue, ferric oxide, cadmium red or cadmium yellow or filler such as potassium carbonate, clay or silica may be added to the present coating composition. The amount of such pigment or filler is preferably below 20 phr. from viewpoint of performance of the coating.

Further, if desired, any known surface active agent or any other additive may be used.

As methods for producing a powdery coating composition of a vinyl chloride copolymer resin, melt-blending method and dry-blending method are known, but in the present invention dry-blending method is employed. In dry-blending method, a powdery vinyl chloride copolymer resin and such liquid additive as a plasticizer or a stabilizer, etc. are mixed vigorously at a temperature considerably lower than the melting point of the plasticized vinyl chloride cpolymer resin for example at about 100° C. As a result, the liquid additive is absorbed in the resin and powdery composition of the vinyl chloride copolymer resin can be obtained in a dry state without changing remarkably the shape of the particles of the powders of the starting vinyl chloride polymer resin.

The present invention will be concretely explained in the following examples in which the mixing ratios are all by weight. However, the present invention is not limited to these particular examples.

EXAMPLE 1

(a) Production of a vinyl chloride copolymer

An emulsion-polymerization was conducted at 64° C. by the prescription shown in the following in a glass lined autoclave of a capacity of 100 liters:

| | Parts |
|---|---|
| Deionized water | 150 |
| Vinyl chloride | 99 |
| Glycidyl methacrylate | 1 |
| Hydrogen peroxide | 0.054 |
| Sodium formaldehyde sulfoxylate | (1) |
| Trichlorethylene | 1.5 |
| Sodium lauryl sulfate | 0.2 |

[1] 1.0 equivalent mol (to hydrogen peroxide).

Prior to the polymerization, the system was deoxygened according to usual method and hydrogen peroxide and formaldehyde sulfoxysodium were gradually added with separate proportional pumps. With a polymerization time of 7 hours and 50 minutes, a latex was obtained at an yield of 85%. When the latex was salted out, heat-treated, dried and crushed according to a known manner, there was obtained a fine powder of an average polymerization degree of 600 and a secondary particle diameter of 45 microns. Various powdery compositions shown in Table 1 were prepared by using various vinyl chloride-glycidyl methacrylate copolymers obtained by the polymerization by substantially the same process as is mentioned above except that the proportions of the monomers and the amount of trichlorethylene were varied. There was prepared a coating composition by using a vinyl chloride homopolymer (prepared by conventional emulsion-polymerization) of an average polymerization degree of 600.

(b) Production of a powdery composition

When the ingredients of the prescriptions shown in Table 1 were placed in a 9 1-Henschel mixer equipped with a jacket, heated at a temperature 5° C. lower than the upper limit of the dry blending temperature by introducing steam into the jacket, and mixed for 30 min- under 3000 r.p.m., there were obtained powdery compositions passing through a sieve of 40 meshes.

The characteristics of the vinyl chloride copolymers and powdery compositions were as shown in the same Table 1.

TABLE 1

| Items | Experiment Number | | | | | |
|---|---|---|---|---|---|---|
| | 1 | 2 | 3 | 4 | 5 | 6 |
| Vinyl chloride copolymer resin: | | | | | | |
| Composition (charge): | | | | | | |
| Vinyl chloride | 100 | 99.7 | 99.5 | 99.0 | 95.0 | 90.0 |
| Glycidyl methacrylate | | 0.3 | 0.5 | 1.0 | 5.0 | 10.0 |
| Trichloroethylene | 1.7 | 1.5 | 1.5 | 1.5 | 1.3 | 1.2 |
| Characters: | | | | | | |
| Average polymerisation degree | 600 | 610 | 590 | 600 | 580 | 590 |
| Secondary particle diameter (microns) | 35 | 40 | 50 | 45 | 40 | 50 |
| Powdery composition: | | | | | | |
| Composition: | | | | | | |
| Above mentioned resin | 100 | 100 | 100 | 100 | 100 | 100 |
| Dioctyl phthalate | 30 | 30 | 30 | 30 | 30 | 30 |
| Titanium dioxide | 5 | 5 | 5 | 5 | 5 | 5 |
| Organic tin series stabilizers | 3 | 3 | 3 | 3 | 3 | 3 |
| Characters: | | | | | | |
| Upper limit of the dry blending temperature (° C.) [1] | 85 | 90 | 105 | 101 | 120 | 120 |
| Caking property [2] | ([3]) | Caked | ([4]) | ([4]) | ([4]) | ([4]) |
| Minimum melting temperature (° C.) [5] | 185 | 185 | 185 | 185 | 195 | ([6]) |
| Maximum melting temperature (° C.) [7] | 220 | 220 | 220 | 220 | 225 | ([6]) |
| Gloss of the film [8] | 95 | 95 | 95 | 95 | 90 | <10 |
| Adhesion of the film (kg./cm.) [9] | <0.1 | 0.5 | 1.5 | 2.5 | 3.1 | |

[1] Upper limit of the dry blending temperature: The minimum temperature at which the contents lump when 2 kg. of all the ingredients are put into a Henschel mixer of a capacity of 9 liters and heated while the blades of the mixer are rotated at 3,000 r.p.m.
[2] Caking property: About 25 g. of the sample are put into a cylindrical vessel of an inside diameter and depth of 50 mm. each, a cylindrical weight of a bottom diameter of 40 mm. and a weight of 500 g. is placed thereon, the sample is thus left standing at a temperature kept at 30±2° C. for 7 days and then the degree of the caking of the powder is judged with hands.
[3] Cake hard.
[4] Released easily.
[5] Minimum melting temperature: About 2 g. of the sample are placed on a degreased mild steel plate of 70 x 150 x 0.5 mm. Then the sample is lightly pressed well with a spatula and heated well with an air circulation oven kept at various temperatures and then the molten state is examined to determine the minimum temperature at which the powdery composition melts to form a glossy surface.
[6] Not melted.
[7] Maximum melting temperature: The maximum tepmerature at which no coloring is recognized in the film when the molten film is examined by the same process as in footnote 5.
[8] Gloss of the film: A mild steel plate of 70 x 150 x 0.5 mm. is ground with an emery cloth of No. 180, is painted by means of an electrostatic powder painting machine (Stajet or REP-Gun) so that the thickness of the molten film is 200–250$\mu$. The film is heated at 210° C. for 7 minutes so that the film may melt and is used as a test plate to measure the specular reflection factor at 60 degrees.
[9] Adhesion of the film: Two parallel cutting lines 1 cm. apart are made with a razor blade in the lengthwise direction of a test plate prepared by the same process as in footnote 8 and the peeling strength of the part of the width is tested by peeling at a velocity of 5 cm./min. in the direction of 180 degrees with a Shopper type tensile strength testing machine.

As evident from the results in Table 1, when glycidyl methacrylate was less than 0.5%, the anticaking property of the composition was reduced and the adhesion to the metal was insufficient for the practice. On the other hand, when glycidyl methacrylate was 10%, the composition no longer melted.

EXAMPLE 2

Such powdery compositions as in Table 2 were obtained by the same process as in Example 1 by using vinyl chloride copolymers of various average polymerization degrees obtained by the polymerization by substantially the same process as in Example 1 except that the amounts of trichlorethylene and hydrogen peroxide were varied.

As apparent from the results in Table 2, when average polymerization degree of the vinyl chloride copolymer was 300, the powdery composition produced therefrom was likely to blocking, and when average polymerization degree of the vinyl chloride copolymers was 800, not only the minimum melting temperatures of the powdery compositions produced therefrom were high, but also gloss of the films was poor. On the other hand, if the average polymerization degrees of the vinyl chloride copolymers were between 400 and 700, powdery compositions excellent in these properties without such defects as mentioned above were obtained.

EXAMPLE 3

Such powdery compositions as in Table 3 were prepared by using the resin in Experiment No. 10 (Example 2).

TABLE 2

| Items | Experiment Number | | | | | |
|---|---|---|---|---|---|---|
| | 7 | 8 | 9 | 10 | 11 | 12 |
| Vinyl chloride copolymer resin: | | | | | | |
| Composition: | | | | | | |
| Vinyl chloride | 100 | 99.9 | 99.0 | 99.0 | 99.0 | 99.0 |
| Glycidyl methacrylate | | 1.0 | 1.0 | 1.0 | 1.0 | 1.0 |
| Trichloroethylene | 0 | 6.0 | 3.5 | 2.2 | 0.7 | 0 |
| Characters: | | | | | | |
| Average polymerization degree | 810 | 320 | 410 | 500 | 690 | 800 |
| Secondary particle diameter (microns) | 40 | 60 | 55 | 40 | 45 | 40 |
| Powdery composition: | | | | | | |
| Composition: | | | | | | |
| Above metnioned resin | 100 | 100 | 100 | 100 | 100 | 100 |
| Dioctyl phthalate | 30 | 30 | 30 | 30 | 30 | 30 |
| Titanium dioxide | 5 | 5 | 5 | 5 | 5 | 5 |
| Organic tin series stabilizer | 3 | 3 | 3 | 3 | 3 | 3 |
| Characters: | | | | | | |
| Upper limit of dry blending temperature (° C.) | 110 | 95 | 105 | 110 | 110 | 120 |
| Caking property | ([1]) | Caked | ([1]) | ([1]) | ([1]) | ([1]) |
| Minimum melting temperature (° C.) | 210 | 180 | 185 | 185 | 195 | 210 |
| Maximum melting temperature (° C.) | 225 | 210 | 215 | 220 | 225 | 225 |
| Gloss of the film | 30 | 95 | 95 | 95 | 92 | 30 |
| Adhesion of the film (kg./cm.) | | 2.8 | 2.3 | 2.4 | 2.6 | |

[1] Released easily.

TABLE 3

| Items | Experiment Number | | | | | |
|---|---|---|---|---|---|---|
| | 13 | 14 | 15 | 16 | 17 | 18 |
| Powdery composition: | | | | | | |
| Composition: | | | | | | |
| Resin of Experiment No. 10 | 100 | 100 | 100 | 100 | 100 | 100 |
| Dioctyl phthalate | 15 | 20 | 25 | 30 | 35 | 40 |
| Titanium oxide | 5 | 5 | 5 | 5 | 5 | 5 |
| Organic tin series stabilizer | 3 | 3 | 3 | 3 | 3 | 3 |
| Characters: | | | | | | |
| Upper limit of the dry blending temperature (° C.) | 120 | 120 | 110 | 110 | 110 | 95 |
| Caking property | (1) | (1) | (1) | (1) | (1) | Caked |
| Minimum melting temperature (° C.) | (2) | 195 | 190 | 185 | 185 | 180 |
| Maximum melting temperature (° C.) | (2) | 220 | 220 | 220 | 220 | 225 |
| Gloss of the film | <10 | 82 | 87 | 95 | 97 | 97 |
| Adhesion of the film (kg./cm.) | | 3.5 | 2.9 | 2.4 | 2.2 | 1.5 |

[1] Released easily.
[2] Not melted.

As evident from the results in Table 3, when dioctyl phthalate was incorporated in the powdery composition in an amount of 15 phr., the powdery composition was not melted, and when dioctyl phthalate was incorporated in the powdery composition in an amount of 40 phr. not only the powdery composition was likely to blocking but also adhesion of the film to a base was poor. On the other hand, if dioctyl phthalate was incorporated in the powdery compositions in an amount between 20 and 35 phr., the powdery compositions excellent in these properties without such defects as mentioned above were obtained.

As additional experiments, the copolymer of Experiment 4 (Table I) was used but the kind and amount of the plasticizer was varied. The properties of films obtained by these powdery compositions are indicated in the following table:

TABLE 4

| Item | Experiment Number | | | | | | | | | | |
|---|---|---|---|---|---|---|---|---|---|---|---|
| | 19 | 20 | 21 | 22 | 23 | 24 | 25 | 26 | 27 | 28 | 29 |
| Powder composition (part by weight): | | | | | | | | | | | |
| Copolymer | 100 | 100 | 100 | 100 | 100 | 100 | 100 | 100 | 100 | 100 | 100 |
| Di-isodecyl adipate | 25 | 30 | 35 | | | | | | | | |
| Di-2-ethyl hexyl adipate | | | | 30 | | | | | | | |
| Di-2-ethyl hexyl sebacate | | | | | 30 | 35 | | | | | |
| Di-n-octyl phthalate | | | | | | | 20 | 30 | | | |
| Di-isodecyl phthalate | | | | | | | | | 30 | | |
| Di-n-butyl phthalate | | | | | | | | | | 30 | |
| Di-n-octyl azelate | | | | | | | | | | | 30 |
| Titanium dioxide | 5 | 5 | 5 | 5 | 5 | 5 | 5 | 5 | 5 | 5 | |
| Organic tin series stabilizer | 3 | 3 | 3 | 3 | 3 | 3 | 3 | 3 | 3 | 3 | 3 |
| Film properties: | | | | | | | | | | | |
| Adhesion (kg./cm.) | 2.3 | 2.1 | 1.8 | 1.9 | 2.1 | 2.0 | 2.8 | 2.5 | 2.4 | 2.5 | 2.3 |
| Smoothness [1] | G | G | G | G | G | G | NG | G | G | G | G |

[1] NG = nearly good; G = good.

EXAMPLE 4

An emulsion-polymerization was conducted at 64° C. by the prescription shown in the following in a glass lined autoclave of a capacity of 100 liters:

| | Parts |
|---|---|
| Deionized water | 150 |
| Vinyl chloride | 94 |
| Vinyl acetate | 5 |
| Glycidyl methacrylate | 1 |
| Hydrogen peroxide | 0.006 |
| Sodium formaldehyde sulfoxylate | (1) |
| Trichlorethylene | 1.8 |
| Sodium lauryl sulfate | 0.2 |

[1] 1.0 equivalent mol (to hydrogen peroxide).

Prior to the polymerization, the system was deoxygenated according to usual method, and hydrogen peroxide and sodium formaldehyde sulfoxylate were separately added with separate proportional pumps. With a polymerization time of 9 hours and 30 minutes, a latex was obtained at an yield of 85%. When the latex was salted out, heat-treated, dried and crushed according to a known manner, there was obtained a fine powder of an average polymerization degree of 510 and a secondary particle diameter of 65 microns. Then such powdery compositions as in Table 5 were obtained by the same process as in Ex-

TABLE 5

| Item | Experiment number | | | | | |
|---|---|---|---|---|---|---|
| | 30 | 31 | 32 | 33 | 34 | 35 |
| Vinyl chloride copolymer resin: | | | | | | |
| Composition: | | | | | | |
| Vinyl chloride | 99 | 99 | 99 | 94 | 94 | 89 |
| Vinyl acetate | | | | 5 | 5 | 10 |
| Glycidyl methacrylate | 1 | 1 | | 1 | 1 | 1 |
| Glycidyl acrylate | | | 1 | | | |
| Trichloroethylene | 2.2 | 2.2 | 2.0 | 1.8 | 1.0 | 0.5 |
| Characters: | | | | | | |
| Average polymerization degree | 500 | 490 | 500 | 510 | 650 | 660 |
| Secondary particle diameter (microns) | 45 | 40 | 48 | 65 | 67 | 69 |
| Powdery composition: | | | | | | |
| Composition: | | | | | | |
| Above mentioned resin | 100 | 100 | 100 | 100 | 100 | 100 |
| Dioctyl phthalate | 25 | 25 | 25 | 25 | 25 | 25 |
| Titanium oxide | 5 | 5 | 5 | 5 | 5 | 5 |
| Organic tin series stabilizer | 3 | 3 | 3 | 3 | 3 | 3 |
| Diaminodiphenylsulfone | | 0.5 | | | | |
| Characters: | | | | | | |
| Upper limit of the dry blending temperature (° C.) | 110 | 110 | 110 | 95 | 100 | 90 |
| Caking property | (1) | (1) | (1) | (1) | (1) | (1) |
| Minimum melting temperature (° C.) | 190 | 190 | 190 | 180 | 190 | 180 |
| Maximum melting temperature (° C.) | 220 | 220 | 220 | 215 | 220 | 215 |
| Gloss of the film | 85 | 83 | 87 | 91 | 87 | 93 |
| Adhesion of the film (kg./cm.) | 2.8 | 3.2 | 2.5 | 2.7 | 2.6 | 2.8 |

[1] Released easily.

ample 2 by using ternary copolymers such as vinyl chloride-vinyl acetate-glycidyl methacrylate (or glycidyl acrylate) and/or binary copolymers such as vinyl chloride-glycidyl methacrylate (or glycidyl acrylate) obtained by the polymerization by substantially the same process.

As evident from the results in Table 5, when vinyl chloride copolymer resins such as vinyl chloride-glycidyl methacrylate copolymer resin, vinyl chloride-glycidyl acrylate copolymer resin, vinyl chloride-vinyl acetate-glycidyl methacrylate copolymer resin and vinyl chloride-glycidyl methacrylate resin (with a curing agent) were used, powdery compositions excellent in adhesion of the film to base were obtained.

What we claim is:

1. A powdery composition for forming a molten coating on the surface of a base, said composition obtained by a dry blending process in which 20–35 parts by weight of one or more plasticizers for vinyl chloride selected from the group consisting of dialkyl adipates wherein the alkyl radicals have from 6 to 10 carbon atoms, dialkyl azelates wherein the alkyl radicals have from 6 to 8 carbon atoms, dialkyl phthalates wherein the alkyl radicals have from 4 to 13 carbon atoms, dialkyl sebacates wherein the alkyl radicals have 8 carbon atoms and epoxidized soy bean oils are absorbed by heating in 100 parts by weight of a vinyl chloride copolymer of an average polymerization degree of 400–700, obtained by emulsion-polymerizing (a) 95.0–99.5% by weight of a monomer selected from a group consisting of vinyl chloride and a monomer mixture consisting of at least 80% by weight of vinyl chloride and another ethylenic monomer copolymerizable with vinyl chloride and (b) 0.5–5.0% by weight of an unsaturated glycidyl compound having in the molecule one unsaturated bond copolymerizable with vinyl chloride and having one or more glycidyl groups.

2. A powdery composition according to claim 1, wherein said ethylenic monomer is vinyl acetate, styrene, vinylidene chloride, or esters having the following general formula:

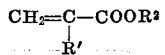

in which R' is hydrogen or methyl group and $R^2$ is alkyl group of from 1 to 9 carbon atoms.

3. A powdery composition according to claim 1, wherein said unsaturated glycidyl compound is glycidyl acrylate, glycidyl methacrylate, glycidyl crotonate, glycidyl alkyl maleates having alkyl radical of from 1 to 9 carbon atoms, allyl glycidyl ether or styryl glycidyl ether.

4. A process for coating a base which comprises forming a molten coating of the powdery composition of claim 1 on said base.

5. An article coated with a coating formed from the composition of claim 1.

6. A composition according to claim 1, wherein the plasticizer is selected from the group consisting of dialkyl adipates wherein the alkyl radicals have from 6 to 10 carbon atoms, dialkyl azelates wherein the alkyl radicals have from 6 to 8 carbon atoms, dialkyl phthalates wherein the alkyl radicals have from 4 to 13 carbon atoms, and dialkyl sebacates wherein the alkyl radicals have 8 carbon atoms.

References Cited

UNITED STATES PATENTS

| | | | |
|---|---|---|---|
| 2,470,324 | 5/1949 | Standinger | 260—863 |
| 3,062,758 | 11/1962 | Rainer | 260—2.5 |
| 3,090,763 | 5/1963 | Hillier | 260—23 |

OTHER REFERENCES

The Behavior of Plasticizers, Ibert Mellan (1961).

MORRIS LIEBMAN, Primary Examiner

R. ZAITLEN, Assistant Examiner

U.S. Cl. X.R.

260—31.2 R